United States Patent [19]
Sedgwick et al.

[11] 3,746,374
[45] July 17, 1973

[54] JOINT ARRANGEMENTS

[75] Inventors: Gordon Sedgwick, Roy Lindop, both of Bolton; Tom Worsley Nelson, Rosseldale, all of England

[73] Assignee: Joseph Lucas (Industries) Limited, Birmingham, England

[22] Filed: Dec. 7, 1970

[21] Appl. No.: 95,557

[30] Foreign Application Priority Data
Dec. 9, 1969 Great Britain.................. 59,939/69

[52] U.S. Cl............... 285/187, 285/238, 285/334.5, 285/DIG. 6
[51] Int. Cl................................................ F16l 49/00
[58] Field of Search............... 285/187, 238, DIG. 6, 285/DIG. 5, 334.5, 234, 263

[56] References Cited
UNITED STATES PATENTS

| | | | |
|---|---|---|---|
| 2,439,351 | 4/1948 | Thayer et al.................. | 285/334.5 X |
| 185,326 | 12/1876 | Jones........................... | 285/334.5 X |
| 2,466,317 | 4/1949 | Kane............................ | 285/334.5 X |
| 739,707 | 9/1903 | Park............................. | 285/263 |
| 3,411,812 | 11/1968 | Prince et al.................. | 285/187 |
| 2,396,320 | 3/1946 | Gaudenzo et al............. | 285/187 |
| 2,549,741 | 4/1951 | Young........................... | 285/334.5 |
| 2,645,099 | 7/1953 | Cumming..................... | 285/334.5 X |

FOREIGN PATENTS OR APPLICATIONS
1,305,379 8/1962 France.............................. 285/334.5

*Primary Examiner*—Thomas F. Callaghan
*Attorney*—Holman & Stern

[57] ABSTRACT

A joint arrangement for connecting metal and ceramic parts having different coefficients of thermal expansion includes a pair of metal parts and a ceramic part clamped between them. The metal parts are each formed with frusto-conical surface, the surfaces being coaxial and having different included angles. The ceramic part has a pair of frusto-conical surfaces which are engaged by the corresponding surfaces on the metal parts. The metal parts are secured together so as to permit relative movement of the surfaces during thermal expansion, the included angles being such that points on these surfaces move along the generating lines thereof during thermal expansion.

8 Claims, 7 Drawing Figures

JOINT ARRANGEMENTS

BACKGROUND OF THE INVENTION

This invention relates to arrangements for joints between metal and ceramic materials and has as an object to provide such a joint in an improved form.

SUMMARY OF THE INVENTION

A joint arrangement according to the invention comprises first and second substantially co-axial metal parts of annular cross-section and formed with substantially co-axial surfaces of revolution, the said surfaces having straight generating lines which are mutually inclined, and a ceramic part of annular cross section and formed with a pair of surfaces of revolution having straight generating lines whose inclinations to their common axis are respectively substantially equal to the inclinations to the associated axis of the generating lines of the said surfaces on the said metal parts, the said metal parts being secured together so as to permit, during thermal expansion, relative movement between their surfaces of revolution and so as to engage by clamping action the corresponding surfaces on the ceramic part, the arrangement being such that points on the said surfaces of the metal parts move, during thermal expansion, along paths which form the generating lines of the corresponding surfaces.

Examples of the invention will now be described with reference to the accompanying drawings in which:-

DETAILED DESCRIPTION OF THE EMBODIMENTS

Figure 1:
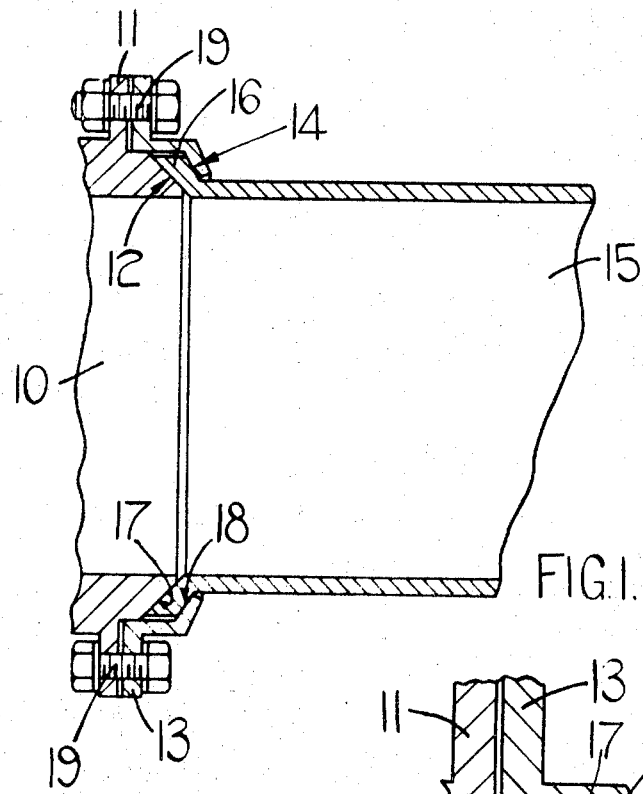
FIG. 1 is a section through a joint.

In the joint shown in FIG. 1 a generally cylindrical metal part 10 includes a flange 11 and is formed with a co-axial frusto-conical surface 12. A metal ring 13 is adapted to engage the part 10 and is formed with an inwardly directed lip which defines a frusto-conical surface 14. The included angle of the surface 12 is less than that of the surface 14. A generally cylindrical ceramic part 15 includes an outwardly directed flange 16. The flange 16 is formed with a pair of co-axial frusto-conical surfaces 17, 18 whose included angles are respectively equal to the included angles of the surfaces 12, 14. The flange 16 is engaged between the part 10 and the ring 13. The ring 13 is urged towards the part 10 by is 19, to secure the flange 16 by clamping action.

Figure 2:
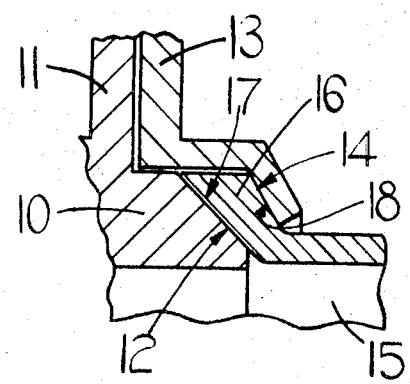
FIG. 2 is a view, to a different scale, of part of the joint in FIG. 1.
Figure 3:
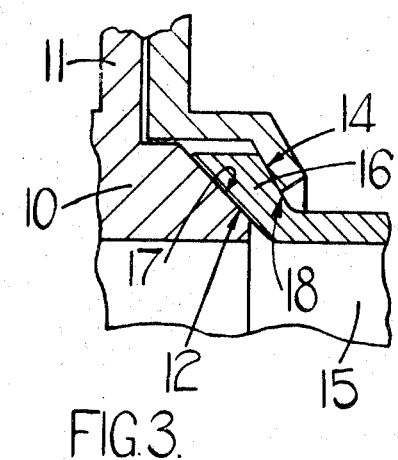
FIG. 3 shows the effect of a temperature rise on the part in FIG. 2.

FIG. 2 shows the position of the flange 16 relative to the part 10 and ring 13 when initially assembled. FIG. 3 shows the assembly at a higher temperature which is nevertheless below the level at which the material of the part 15 undergoes any significant dimensional change. Temperature rise causes the part 10 and ring 13 to expand radially. The axial dimension of the part 10 within the ring 13 is less than the axial dimension of the ring 13 itself. Expansion also therefore causes the surface 14 to move away from the face 12. The difference between the included angles of the surfaces 12, 14 is dependent on the relative radial and axial expansions of the part 10 and ring 13, provided that dimensional changes in the part 15 may be ignored. For a given angle of the surfaces 12, 17 the angle of the surfaces 14,18 is defined by the locus of a point on the surface 14 moving, with respect to the flange 16, as a result of radial and axial expansion of the part 10 and ring 13. A clamping action is thus maintained on the flange 16, while at the same time there is no stress applied to the part 15 as a result of thermal expansion.

For practical purposes part 10 and ring 13 may be considered as having identical radial expansions. If it is required to take the expansion of part 15 into account, any axial expansion of flange 16 may likewise be ignored. The effective radial expansion of part 10 and ring 13 is in this case the total expansion of these components, less the radial expansion of flange 16. The angle between surfaces 12, 17 and surfaces 14, 18 will be smaller than if expansion of part 15 is absent or may be disregarded.

Figure 4:
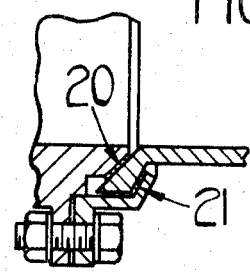
FIGS. 4, 5, 6 and 7 show examples of alternative forms of joint.

Preferably the frusto-conical surfaces of the parts are machined to a smooth surface to allow sliding between the flange 16 and the part 10 and ring 13. Alternatively, as shown in FIG. 4, a pair of layers 20, 21 of a suitable resilient packing material are interposed between the surfaces 12, 17 and 14, 18 respectively. Such packing materials are commercially available under the trade names "FIBERFAX" and "KAO-WOOL". Movement between the metal and ceramic surfaces is in this case absorbed by the layers 20, 21. The surface areas of the layers 20, 21 are preferably substantially identical so that the compressions of the layers are equal.

Figure 5:
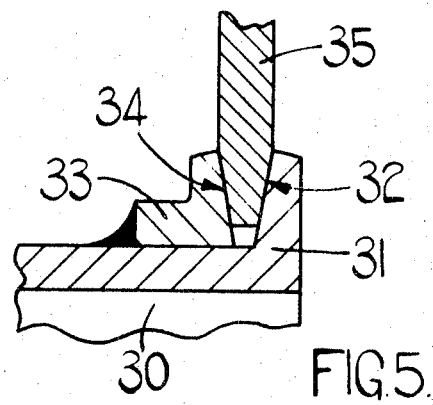

The alternative form of joint shown in FIG. 5 comprises a cylindrical metal part 30 having a flange 31 formed with a frusto-conical surface 32. A metal ring 33 is secured to the part 30 by welding or brazing and is formed with a frusto-conical surface 34. The included angles of the surfaces 32, 34 are equal. The surfaces 32, 34 are not, however, parallel, and define an annular recess in which a ceramic disc 35 is engaged. The disc 35 is formed with frusto-conical surfaces which align with the surfaces 32, 34. The arrangement is such that thermal expansion causes the surface 34 to move away from the surface 32, enabling the part 30 and ring 33 to expand radially to the position shown, clamping action being maintained on this disc 35 substantially as previously described.

Figure 6:
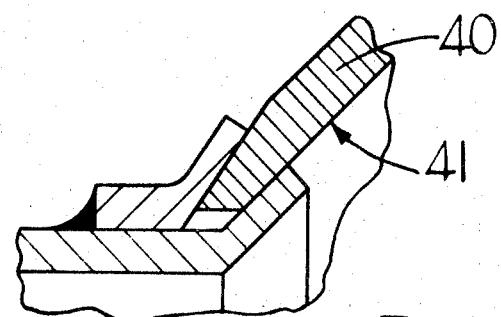

The arrangement shown in FIG. 6 is essentially the same as that shown in FIG. 5, except that a ceramic part 40 is itself of generally frusto-conical form and has an inside surface 41 which forms one of the surfaces of the joint.

In the foregoing arrangements the circumferential dimensions, adjacent the ceramic part, of the two metal parts have been such that their radial thermal expansions have been substantially identical. In the arrangement shown in FIG. 7 two metal parts 45, 46 have respective non-parallel frusto-conical surfaces 47, 48 and are secured together so as to engage a ceramic part 49. The ceramic part 49 has corresponding frusto-conical surfaces, as before. Rise in temperature results in a larger radial expansion of part 46 than of part 45adjacent part 49. Expansion of part 45 causes part 49 to move relatively leftward, as shown in the drawing. Surface 48 moves away from surface 47 but the increasing thickness of the part 49 maintains the part 45, 46 in clamping engagement.

Figure 7:
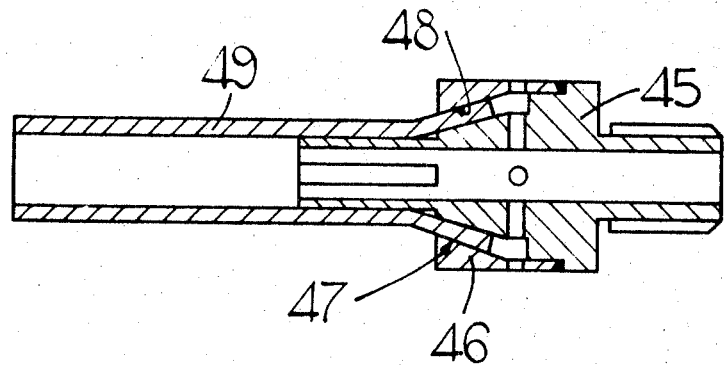

It will be understood that any of the alternative arrangements shown in FIGS. 5 to 7 may include suitable resilient packing material, as described in connection with FIG. 4.

Having thus described our invention what we claim as new and desire to secure by Letters Patent is:-

1. A joint arrangement comprising first and second substantially co-axial metal parts of annular cross-section and provided with substantially co-axial surfaces of revolution, the said surfaces having straight generating lines which are mutually inclined, and a ceramic part of annular cross section and provided with a pair of surfaces of revolution having straight generating lines whose inclinations to their common axis are respectively substantially equal to the inclinations to the associated axis of the generating lines of said surfaces on said metal parts, means securing said metal parts together so as to permit, during thermal expansion, relative movement between their surfaces of revolution and so as to engage by clamping action the corresponding surfaces on the ceramic part, the arrangement being such that points on the said surfaces of the metal parts move, during thermal expansion, along paths which define the generating lines of the corresponding surfaces.

2. The joint arrangement as claimed in claim 1 in which each of the surfaces of revolution on said metal parts has a free end between which ends the ceramic part extends, in which the metal parts are secured together at a location spaced from the said free ends and in which the axial dimension of one of the parts between the said location and the free end of the said one part is greater than the corresponding dimension on the other of the parts.

3. The joint arrangement as claimed in claim 1 in which each of the surfaces of revolution on said metal parts has a free end, between which ends the ceramic part extends, and in which the radius of the free end of one of the parts is greater than the radius of the free end of the other of the parts.

4. The joint arrangement as claimed in claim 2 in which the surfaces of revolution diverge towards the said free ends.

5. The joint arrangement as claimed in claim 2 in which the surfaces of revolution converge towards the said free ends.

6. The joint arrangement as claimed in claim 2 in which the included angles of the surfaces of revolution, are substantially equal.

7. The joint arrangement as claimed in claim 1 in which layers of resilient packing material are interposed between adjacent surfaces of revolution.

8. In a joint arrangement between a metal tube having an external annular flange and a ceramic tube having an external annular flange and a metal ring cooperable with the flanges of the tubes for securing the tubes together, said metal tube having a co-axial frusto-conical surface, said metal ring having an inwardly directed lip defining a frusto-conical surface, the included angle of the frusto-conical surface of the metal tube being less than that of the frusto-conical surface of the metal ring, the flange of the ceramic tube having first and second co-axial frusto-conical surfaces, the included angles of the frusto-conical surfaces of the flange of the ceramic tube being respectively equal to the included angles of the frusto-conical surfaces of the metal tube and metal ring, the first and second frusto-conical surfaces of the ceramic tube engaging the frusto-conical surfaces of the metal tube and metal ring respectively, and the axial dimension of the metal tube within the metal ring being less than the axial dimension of the ring itself, the arrangement being such that, during thermal expansion, the frusto-conical surface of the metal ring moves away from the frusto-conical surface of the metal tube thereby maintaining a clamping action on the flange of the ceramic tube and at the same time applying no stress to the ceramic tube as a result of thermal expansion.

* * * * *